United States Patent [19]

Hill

[11] 4,210,038
[45] Jul. 1, 1980

[54] LATHE HAVING A GUIDED MOVABLE CUTTER

[75] Inventor: Edward G. Hill, San Diego, Calif.

[73] Assignee: Continuance Curve Contact Lenses, Inc., San Diego, Calif.

[21] Appl. No.: 7,165

[22] Filed: Jan. 29, 1979

Related U.S. Application Data

[63] Continuation-in-part of Ser. No. 812,768, Jul. 5, 1977, abandoned.

[51] Int. Cl.$^2$ .................... B23B 3/28; B23B 5/40
[52] U.S. Cl. ........................ 82/11; 82/14 B; 82/19; 51/105 LG
[58] Field of Search ............. 82/11, 12, 14 B, 14 R, 82/19; 51/55, 124, 105 LG, 106 LG

[56] References Cited

U.S. PATENT DOCUMENTS

| | | | |
|---|---|---|---|
| 3,066,561 | 12/1962 | Auerbach | 82/19 |
| 3,205,780 | 9/1965 | Matousek | 82/19 X |
| 3,762,247 | 10/1973 | Sherwood | 82/12 |
| 3,913,274 | 10/1975 | Raiford | 82/12 |

*Primary Examiner*—Harrison L. Hinson
*Attorney, Agent, or Firm*—Wills, Green & Mueth

[57] ABSTRACT

An automatic or semi-automatic lathe especially useful for producing pre-determined optical surfaces on plastic contact lenses. A collet supported on the spindle of a variable speed motor supports a lens blank in coaxial alignment with the spindle. A cutter is held in a vertically adjustable tool post mounted on one of a pair of stacked stages arranged for linear movement radial and axial of the lens blank, respectively. The other stage is mounted on a carriage which in turn is mounted on the base of the lathe and arranged for linear movement radial of the lens blank. A second variable speed motor acting through a pair of cam-operated X/Y drive mechanisms supported on the carriage drives the stages to move the cutter across and into the face of the rotating lens blank, thereby generating any desired combination of concave and/or convex optically curved surfaces. In an alternative embodiment, individual variable speed motors power the X/Y drive mechanisms through sliding wedges or the like.

17 Claims, 10 Drawing Figures

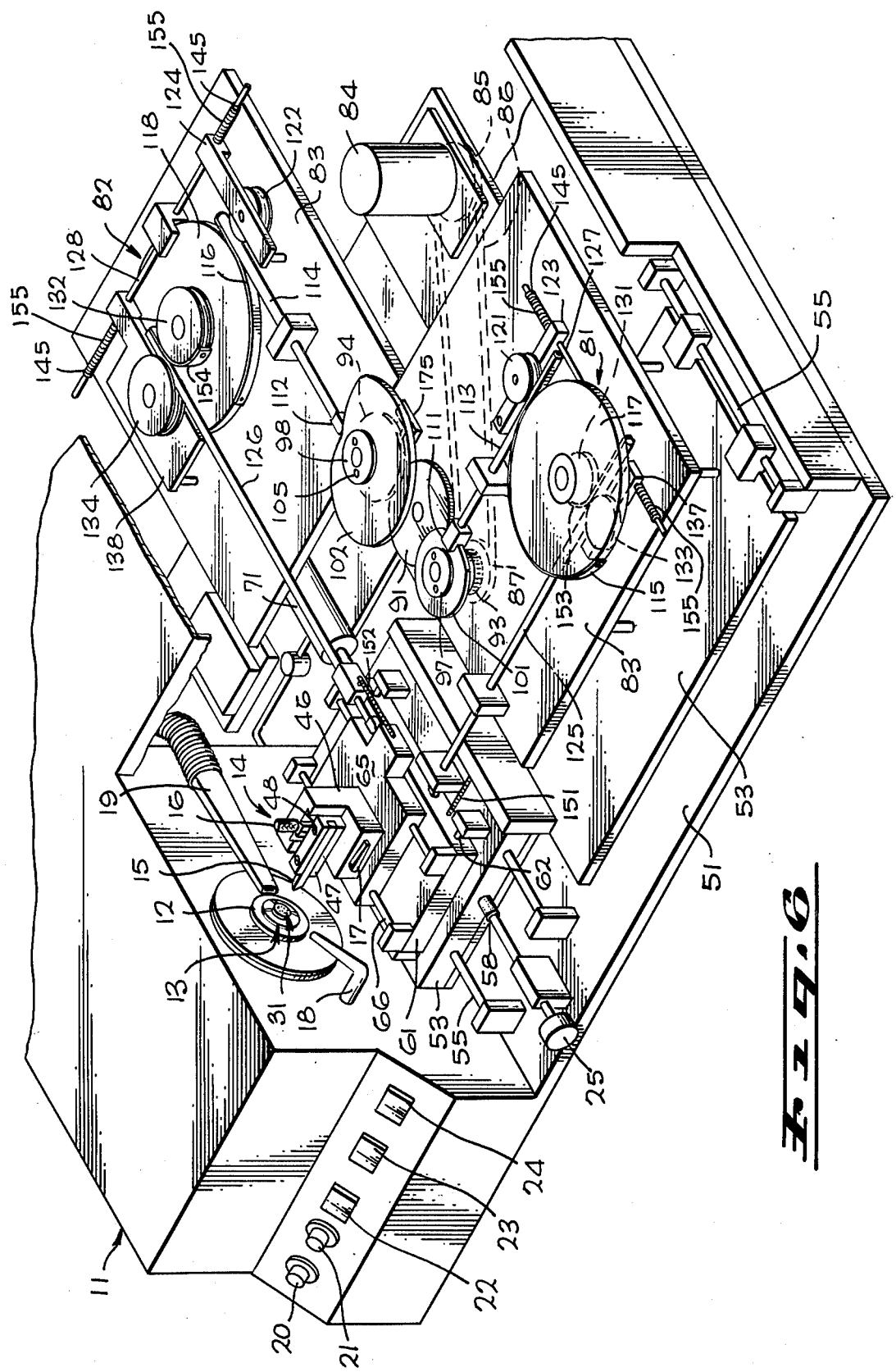

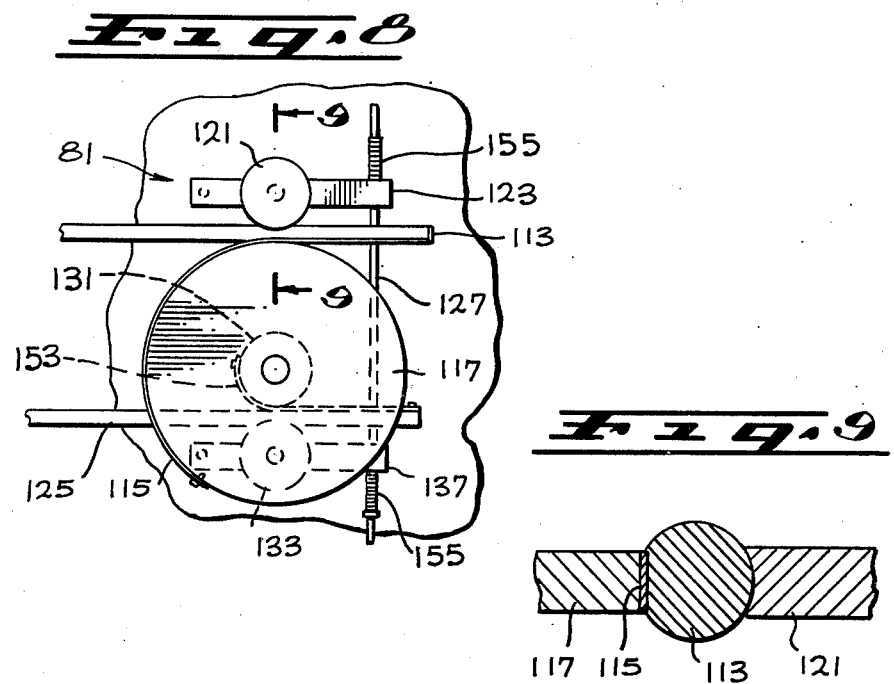
Fig. 8
Fig. 9
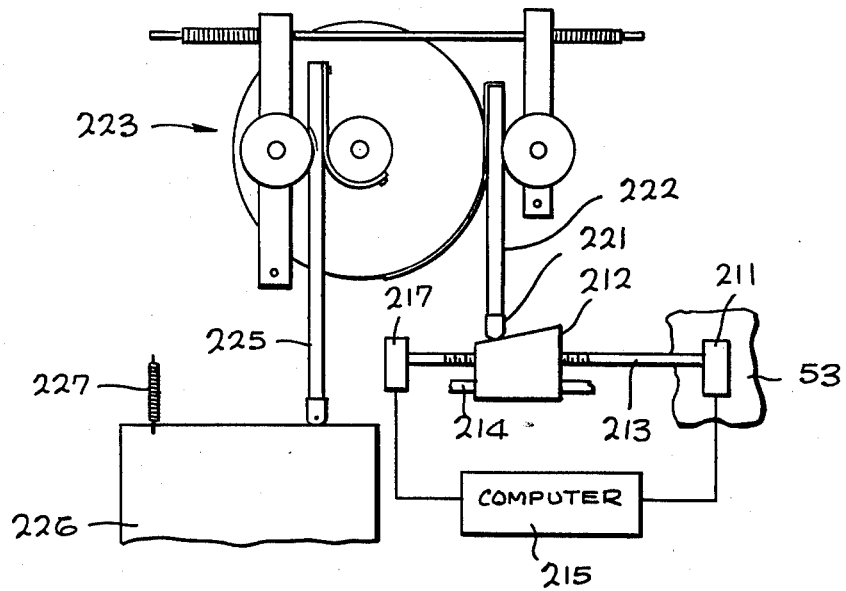
Fig. 10

LATHE HAVING A GUIDED MOVABLE CUTTER

CROSS-REFERENCE TO RELATED APPLICATION

This application is a continuation-in-part of copending Application Ser. No. 812,768, filed July 5, 1977, now abandoned.

BACKGROUND AND BRIEF SUMMARY OF THE INVENTION

This invention relates generally to machines for producing optical surfaces on lenses, and more particularly to lathes for cutting such surfaces on plastic contact lenses. Specifically it pertains to a lathe having a controllable, guided, movable cutter.

The introduction of new materials and fitting techniques and growing public acceptance have created an unprecedented demand for plastic optical contact lenses. The methods and machinery available to optical laboratories for surfacing these lenses have not kept pace with this demand. Conventional honing, grinding and polishing methods employed to produce relatively large, glass spectacle lenses do not lend themselves to the production of the diminutive plastic contact lenses. The equipment for carrying out these methods, such as the devices shown and described in U.S. Pat. Nos. 2,392,478, 2,975,565, 3,021,647 and 3,900,971, are illsuited for processing contact lens blanks, and are particularly unsatisfactory for cutting the relatively new plastic lenses. Some attempts have been made to apply automated milling techniques to the production of plastic contact lens, but tape-programmable mills are costly and require specially trained operators.

Lacking surfacing machines specifically designed for producing plastic contact lenses, attempts have been made to adapt the conventional shop lathe by providing various types of manually operated or powered radius-turning attachments for the cutting tool. These adaptions suffer from a number of dificiencies.

Thus, because conventional lathes swing the cutter around a fixed center of rotation, the finish surface of the lens is cut by a single point of contact of the cutter therewith. This subjects the cutting tool to excessive wear and the tool and workpiece to undue heating. Secondly, they require that the tool post and drive assembly be repositioned each time the radius of the curvature of the optical surface is changed. Such hybrid machines are difficult and time-consumming to set up and need skilled operators to operate and maintain them. Additionally, they are susceptible to harmonically induced vibrations which produce poorly finished lens surfaces requiring extensive timeconsuming polishing. So far as known, none of them is capable of high-volume automated operation, or an ability to cut any continuous complex curved surface such as concave-convex-concave in one cycle of the cutting tool.

Accordingly, a principal object of the subject invention is to provide a lathe for producing plastic contact lenses, wherein the cutting tool moves orthoganally, rather than circularly as in the prior art devices, thereby reducing tool wear and overheating.

Another important object of the invention is to provide a surfacing machine which can be run by semi-skilled operators in the typical optical laboratory so as to produce large numbers of finely finished or precision contoured plastic contact lenses with a minimum labor force.

A further object is to provide a machine of this type which can be manufactured relatively inexpensively and which requires little maintenance and upkeep.

Yet another object is the provision of an automatic or semi-automatic surfacing lathe for plastic contact lenses which utilizes a controllably guided moveable cutter assembly to produce aspheric optical surfaces in a single cutting operation.

Another object is the provision of such a lathe in which the movement of the cutter assembly is precisely guided, throughout the surface-cutting operation.

Yet another object is the provision of a lathe of this type in which the workpiece is secured directly to the spindle of the drive motor, thereby minimizing harmonically induced vibrations and enhancing the surface finish.

The subject invention generally comprises a variable speed, high-torque D.C. motor mounted on an elongated base. An air-activated collet within the motor spindle holds a cylindrical plastic lens blank or "button" in coaxial alignment with the spindle.

A diamond cutter is supported in a vertically adjustable tool post mounted to the upper one of a pair of stacked stages which are adapted for orthonginal linear movement axial and radial of the lens blank, respectively. The lower one of the stages is mounted on a carriage which is itself mounted on the base and arranged for linear movement radial of the workpiece.

In one preferred embodiment, a second variable speed, D.C. motor and a pair of cam-operated X/Y drive mechanisms are mounted on the carriage and drive the stages to move the cutter radially and axially of the rotating lens blank, thereby generating the desired optical surface or surfaces. In an alternative embodiment, individual controlled variable speed motors power the X/Y drive mechanisms through sliding wedges or the like.

In both embodiments, an adjustable stop allows the cutter to be manually centered relative to the axis of rotation of the lens blank. Thereafter, programmable control means automatically position the carriage against the adjustable stop and cycle the cutter thru the lens surfacing operation.

BRIEF DESCRIPTION OF THE DRAWINGS

In the drawings:

FIG. 6 is an enlarged, perspective view of the lathe of FIG. 1, with portions of the cabinet and internal structure cut away for illustrative purposes;

FIG. 7 is a top plan view of the lathe of FIG. 6;

FIG. 8 is an enlarged, fragmentary, top plan view of the radius-generating drive mechanism;

FIG. 9 is an enlarged fragmentary sectional view taken in the direction 9—9 of FIG. 8, showing the bank drive construction; and FIG. 10 is a diagramatic, top plan view of an alternative stage-drive mechanism.

DESCRIPTION OF THE PREFERRED EMBODIMENTS

Figure 1:
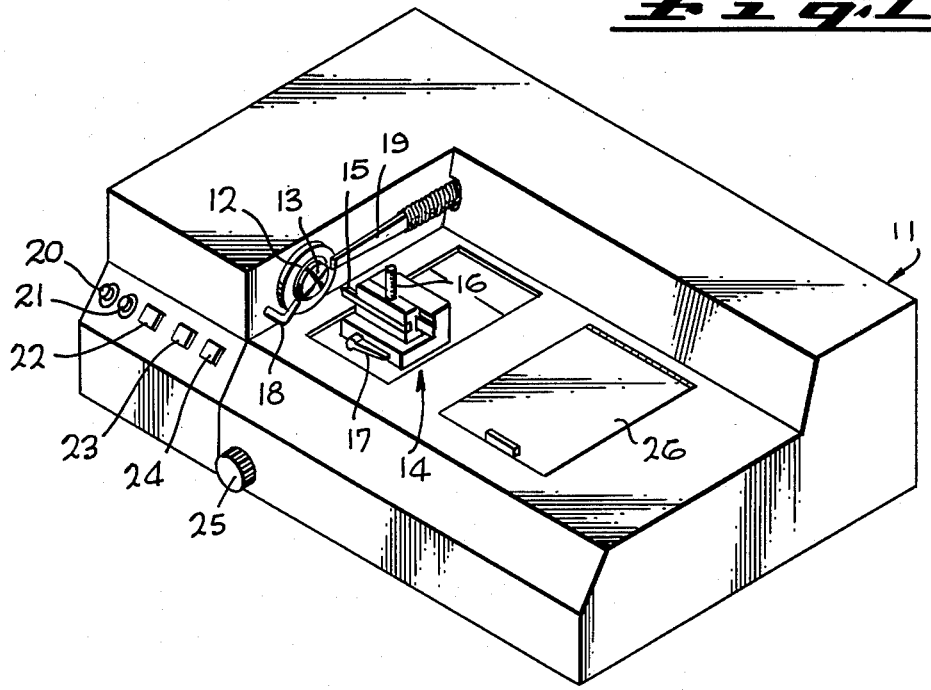
FIG. 1 is a perspective view of the exterior of a lathe constructed in accordance with the teachings of the subject invention.

Referring to FIG. 1, a cam-guided contact lens lathe 11 embodying the teachings of the present invention is shown as enclosed in a compact cabinet adapted to be mounted on a bench or sturdy moveable stand. The principal features visible externally are a motor spindle 12, a lens blank mounting collet 13, a cutting mechanism 14 with a cutter 15, a vertical positioning knob 16, a coarseness selector handle 17, a coolant tube 18 and a suction head 19. A control panel containing a feed speed control 20, a spindle speed control 21, a power switch 22, a collet actuator switch 23, and an automatic cut switch 24 is placed conveniently at the front of the cabinet, together with an adjustable stop knob 25, which permits the cutting mechanism 14 to be located manually with the cutter 15 centered on the lens blank.

A hinged access cover 26 is provided to give the operator convenient access to the guidance mechanism and to facilitate the insertion and removal of the cams.

Figure 2:
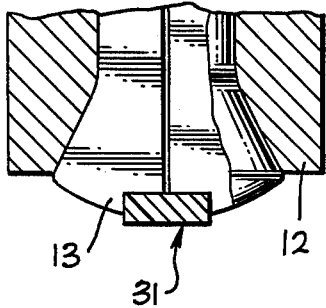
FIG. 2 is an enlarged, fragmentary, side sectional view taken through the spindle nose and collect of the lathe of FIG. 1, showing a lens blank held in the collect jaws.

FIG. 2 shows a typical cylindrical lens blank 31 of any of the plastic materials currently used for so-called "soft" contact lenses, inserted into and securely held by the collet 13. As will be described hereinafter, a novel feature of the invention resides in the construction of the collet 13 with a shaft passing through and aligned coaxially with the hollow spindle 12 of the lathe drive motor. This arrangement substantially eliminates the vibration commonly associated with the off-axis drive mechanisms used in conventional lathes, because the lens blank 31 is automatically locked in coaxial alignment with the spindle 12 when the collet is closed. For ease and speed of operation, the collet 13 is pneumatically actuated.

Experience has indicated that a better and more comfortable fit may be obtained with plastic contact lenses which have three curves on the posterior surface. These include the primary concave base curve which conforms generally to the shape of the human eyeball, a secondary peripheral annular curve of somewhat greater radius, and a blend curve providing a smooth transition between the curves. The blend and peripheral curves serve to allow lachrymal fluid to flow between the lens and the surface of the eyeball.

Figure 3:
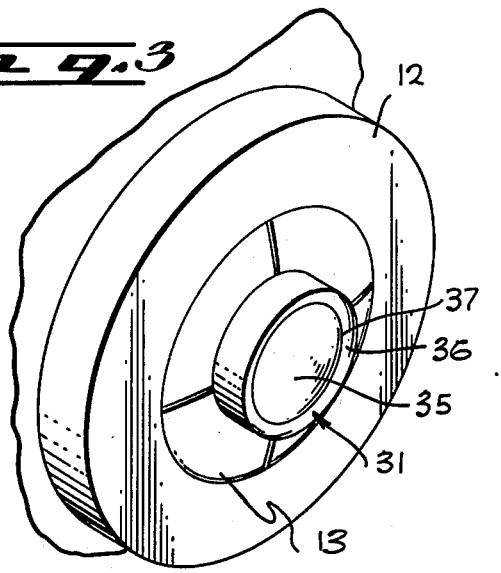
FIG. 3 is an enlarged, perspective view showing the lens blank of FIG. 2 after a complex surface has been cut in its exposed face.

FIG. 3 shows the lens blank 31 of FIG. 2 after the peripheral curve 36, blend curve 37 and base curve 35 have been machined thereon. It should be recognized that these curves were generated in a single continuous operation, and without the need to reposition the cutter 15.

Although the aforementioned mounting arrangement substantially eliminates chatter and eccentricity in the lens blank, when lathing some plastics, and particularly when deep curves are made, the mass of material which is being removed prevents the cutter from tracking smoothly. For this reason, the cutter support mechanism 14 of the present invention includes means operated by selector handle 17 for advancing the cutter 15 of a few thousandths of an inch toward the workpiece 31. With the cutter thus advanced, a second pass across the face of the lens blank 31 produces an optical surface which requires very little polishing.

Figure 4:
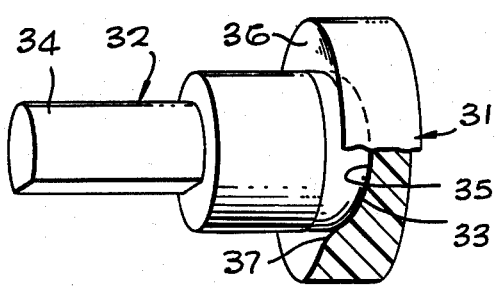
FIG. 4 is an enlarged, perspective view of the partially formed lens blank of FIG. 3, mounted on a mandrel, with a portion of the lens blank cut away for illustrative purposes.

The partially formed lens blank 31 is then mounted on a supporting mandrel 32, such as that shown in FIG. 4, as by means of low-melting pitch or other suitable adhesives 33 which can be released and removed from the blank easily and without damage to it. The collet 13 may be used to receive the shank 34 of the mandrel 32 or it may be replaced by another collet especially sized to receive it.

In production, it is frequently advantageous to use two lathes 11, one of which is set up to provide the concave base curve 35, the peripheral curve 36 and the blend curve 37 on the posterior face of the lens blank 31, and the other lathe to provide the convex lenticular curves on the anterior face. With this arrangement, the second lathe is provided with a collet specifically designed to accept the shank 34 of the mandrel 32.

FIGS. 6 and 7 show the internal structure and operation of the lathe 11 of FIG. 1. With reference to both of those figures, the shaft of collet 13 passes through and is slidably keyed to rotate coaxially with the hollow spindle 12 of a vairable speed, high-torque D.C. motor 42. The motor 42, spindle 12, and collet 13 are balanced both statically and dynamically to minimize the effects of vibration on the lens blank. Conventional motor control circuitry (designated by the numeral 43) actuates and controls the speed of the motor 42.

To facilitate the positioning and removal of the lens blank 31, the collet 13 is designed to be opened and closed by means of pneumatic actuating mechanism 44, responsive to the movement of the actuator switch 23. The mechanism 44 moves the collet 13 axially of the spindle 12. The tapered walls at the mount of the spindle 12 serve to force the normally open jaws of the collet to a closed position when the collet 13 is drawn forcibly into the spindle.

An impeller (not shown) which is connected to the adjustable goose-neck coolant tube 18, may be employed to direct coolant such as chilled nitrogen or ambient air across the lens blank 31 while it is being cut. A heavy-duty vacuum source (likewise not shown) is connected to the suction head 19 to remove the scrap and cuttings from the lens blank.

The lathe 11 is mounted on a sturdy base 51. A rigid carriage 53 is slidably supported on rails 55. The rails 55 are carefully mounted to base 51 perpendicular to the imaginery vertical plane containing the central axis of the spindle of motor 42. Accordingly, the carriage 53 can be said to move precisely radially with respect to any lens blank 31 held by collet 13, and thus be aligned with the axis of rotation of the spindle 12.

A vernier controlled rod having a stop 58 formed on its end to abut carriage 53 is operated by knob 25 (shown in FIG. 1), and permits the operator to adjust the radial position of carriage 53, thus allowing the cutter 15 to be centered precisely relative to the axis of rotation of the lens blank.

A first stage 61 is slidably supported on rails 62 which are carefully secured to the carriage 53 perpendicular to the rails 55. Thus, stage 61 moves in a direction which is parallel to or axial with respect to the spindle of the motor 42.

A second stage 65, is in turn slidably supported on rails 66 which are similarly secured to stage 61, perpendicular to the rails 62. It will be understood that in place of rails 55, 62 and 66, ball ways, air bearings and guides, or any combination of these or other suitable support means adapted to allow the desired sliding movement of carriage 53 and stages 61 and 65, can be used.

The assembly 14 is mounted on stage 65, and includes a tool post 46, a tool holder 47, and the cutter 15. The cutter 15 is locked in place in the tool holder 47 by means of set screws 48. A pair of dovetails (for example) on tool holder 47, and matching grooves in the tool post 46, allow the holder 47 to be moved vertically on post 46 by appropriate means controlled by the vertical position knob 16.

While the post 46 may be secured immovable to the stage 65, an alternative mounting arrangement has been found to be of great value. Preferably, the tool post 46 is attached to the stage 65 by a means (not shown) such as a pair of parallel interlocking dovetails and grooves, which permit the post 46 to be moved a few thousandths of an inch in a direction axial or perpendicular to the face of the lens blank 31. This movement may be accomplished by conventional means (likewise not shown) such as a precisely machined cam or wedge which is operated by selector handle 17.

The cylinder of a pneumatic drive 71 is secured to the base 51, and its piston rod attached to the carriage 53. Connected to a source of compressed air (not shown), the drive 71 serves to move carriage 53 radially of the workpiece 31 responsive to the lathe's automatic control circuitry.

A cam-guided radius-generating drive mechanism 81, a cross-feed drive mechanism 82, and a variable speed D.C. gear drive motor 84 which is connected to a D.C. power source (not shown) are mounted on a superstructure 83 which is secured to the carriage 53.

A pulley 85 which is attached to the drive shaft of motor 84, is operatively connected through a belt 86 to a pulley 87 associated with radius-generating drive 81. A spring-biased anti-backlash gear 91 is mounted to the superstructure 83 between the two drive mechanisms 81 and 82, and by engagement with gears 93 and 94 rotates capstans 97 and 98 mounted coaxially with gears 93, 94 respectively, synchronously with one another, and with motor 84.

The capstans 97 and 98 are arranged to receive a radius-generating cam 101, selected from a number of such cams representing geometrically the axial characteristics of the various optical curves, and a standard cross-feed cam 102. As will be seen, the cross-feed cam 102 drives the cutter across the face of the lens blank 31 at a steady rate, while the radius-generating cam 101 determines the depth of the cut made by the cutter 15 as the lens blank 31 is rotated.

It is estimated that one hundred and ten replacable radius-generating cams 101 will reproduce a sufficient number of concave base curves and secondary curves to satisfy the needs of 80%–90% of the population of the United States desiring to wear contact lenses. An additional seven hundred and fifty radius-generating cams 101 will provide the convex curves, including compound lenticular curves, for 70% of said population, nine hundred to one thousand such cams will suffice for about 80% of said population, and one thousand five hundred such cams will take care of substantially 100% of said population.

Locating pins 105 on the capstans 97 and 98 are positioned to register with matching holes in and serve to insure synchronized rotation of cams 101 and 102.

Cam followers 111 and 112 and follower rods 113 and 114 associated with cams 101 and 102, respectively, move axially in response to the cam profiles. As shown in detail in FIGS. 7 and 8, flexible bands 115 and 116 of carbon filament or like material, subject to zero elongation or contraction, are attached at one of their ends to the ends of follower rods 113 and 114, respectively, and pass around and are secured at their opposite ends to capstans 117 and 118. Idler wheels 121 and 122 are mounted to bars 123 and 124, which are pivotably supported on superstructure 83 at one of their ends. Threaded rods 127 and 128, having compression springs 155 and adjustment nuts 145, pass through and apply a force to the end of bars 123 and 124 to hold idler wheels 121 and 122 against follower rods 113 and 114 capstan bands 115 and 116 and capstans 117 and 118. The possibility for error due to elongation or compression of the component parts under stress or distortion of the relative positions of the parts is thus minimized, resulting in an extremely accurate mechanism for transferring movement of the cam followers 111 and 112 into rotational movement of the capstans 117 and 118.

One end of drive rods 125 and 126 abuts and is free for limited lateral motion along the edges of stages 61 and 65, respectively. The opposite ends of the drive rods 125 and 126 pass between capstan portions 131 and 132 formed on capstans 117 and 118.

As depicted in detail in FIGS. 7 and 8, flexible bands 153 and 154 of carbon filament or like material, subject to zeor elongation or contraction, are attached at one of their ends to the ends of the drive rods 125 and 126, respectively, and pass around and are secured at their opposite ends to capstan portions 131 and 132. Idler wheels 133 and 134 are mounted on bars 137 and 138 which are pivotably supported on superstructure 83 at one of their ends.

Threaded rods 127 and 128, having compression springs 155 and adjustment nuts 145, pass through and apply a force to the end of bars 137 and 138, thus holding idler wheels 133 and 134 against drive rods 125 and 126, capstan bands 153 and 154 and capstan portions 131 and 132. This structure is similar to that described above in relation to the capstans 117 and 118, and similarly serves to accurately transfer rotational movement of the capstan portions 131 and 132 into translational movement of the drive rods 125 and 126.

FIGS. 6 and 7 are not to scale. Preferably, the capstan portions 131 and 132 and their respective capstans 117 and 118 are sized to provide a 5:1 reduction in travel between the follower rods 113 and 114 and the drive rods 125 and 126, respectively. This feature serves to enhance the precision with which the cutter 15 responds to the motion of cam followers 111 and 112.

Tension springs 151 and 152 are operatively connected between the carriage 53 and the stage 61, and between the carriage 53 and the stage 65. The forces exerted by tension springs 151 and 152 on stages 61 and 65 are transmitted through drive rods 125 and 125 and carbon bands 153 and 154 to capstans 131 and 132 and wheels 117 and 118 then through bands 115 and 116 to cam follower rods 113 and 114, and finally applying a reduced force to the cams 101 and 102. All parts thus move against a positive preload condition, removing any possibility of backlash occuring in the X/Y drive mechanisms. Furthermore, the force exerted by the cam followers 111 and 112 on the cams 101 and 102, respectively, is greatly reduced. This reduces wear of the cams and cam followers themselves as well as wear of the bearings within which the capstans 97 and 98 are mounted, thereby reducing the future error which would be caused by such wear.

In operation, the collet 13 is opened by means of the switch 23, allowing the lens blank 31 to be inserted into the collet and clamped in place by means of the same switch 23. The diamond cutting tool 15 is installed into the tool holder 47 by means of two sets screws 48.

The selector handle 17 is then moved clockwise as far as possible to move the diamond cutter 15 axially away from the lens blank 31, and the auto feed switch 24 is actuated. This causes the air cylinder 71 to urge the carriage 53 forward against the adjustable stop 58 and causes the spindle 12 to begin rotating. The diamond cutter is thus moved radially inwardly to a position of general alignment with the periphery of the lens blank. The feed speed control 20 is then manually turned to zero, causing the diamond cutter to remain in this position as the lens blank rotates. The selector handle 17 is moved counterclockwise to the point at which the diamond cutter 15 is spaced axially a distance of approximately 0.060 inches away from the one surface of the lens blank 31 and the feed speed control 20 is turned back up to allow the mehcanism to complete one pass of the diamond cutter 15 across the lens blank and thereby to produce a small recessed region therein. When the pass is completed and the drive cams 101 and 102 again reach their initial positions, a microswitch 175 engaging the gear 94 is actuated to stop the motor 84 and to cause the pneumatic drive 71 to return the sliding carriage 53 to its withdrawn position.

The operator is able to check the vertical and horizontal alignment of the diamond cutter relative to the lens blank 31 by analyzing the recessed region formed therein. Improper vertical alignment will leave a raised "post" of uncut material at the center of the recessed portion, while improper horizontal alignment will leave a somewhat different raised portion if the diamond cutter fails to reach the center of the lens blank, or a "burn" if the cutter moves past the center of the blank.

The raised portion, which indicates improper horizontal alignment, is due to a failure to make a complete cut, while the "burn" is due to movement of the cutter past the center of the blank to a point at which the material of the lens blank moves past the cutter in a direction opposite to that in which it was designed to cut. In the latter case, the resulting abrasive action produces heat which forms a thin film of white "burned" material on the lens blank.

Vertical and horizontal alignment is correctable by adjustment of the vertical positioning knob 16 and the adjustable stop knob 25, respectively, and can easily be rechecked by moving the selector handle 17 slightly counterclockwise and again pressing the automatic feed switch 24 to produce a second cut slightly deeper than the first cut. This process is repeated until no raised portion or "burn" is produced, signifying that the apparatus is perfectly aligned.

After alignment, the selector handle 17 is moved counterclockwise to the point at which the diamond cutter 15 is flush with the uncut surface of the lens blank 31. Pressing the automatic feed switch 24 then initates the cutting cycle to produce a full accurate cut. The motor control 43 quickly brings the motor 42 up to desired speed. The pneumatic drive 71 is programmed to thrust carriage 53 into abutment with stop 58, and the drive motor 84 is then activated to rotate cams 101 and 102. This action causes the radius-generating drive mechanism 81 and crossfeed drive mechanism 82 to synchronously move stages 61 and 65 axially and radially to the center of the lens blank 31 in a 5 to 1 relation to the cam contours. When the cut is complete, the profile of cam 101 causes the cutter 15 to be withdrawn from the center of the lens blank 13, clearing the lens blank before the cam drive system finishes its cycle and thus allowing the entire carriage 53 to be drawn rearwardly by the pneumatic drive 71 to position the cutters 15 well clear of the front of the spindle 12. The pneumatic drive 71 is controlled in this mode by the microswitch 175, as described above.

The described 5 to 1 reduction of motion between the motion of the cam followers 111 and 112 and the motion of the diamond cutter 15 has been found to be extremely advantageous in reducing error in the surface formed in the lens blank 31. Thus, one and one half (1.5) inches of travel at the feed cams 15 translates into only three tenths (0.3) of an inch of movement of the cutter, thereby producing finished cuts which are accurate within twenty millionths (0.00002) of an inch.

The finish of the lens surface may be further enhanced by increasing the speed of the spindle 12 relative to the speed at which the cutter 15 is fed. This is accomplishing by adjusting the spindle speed control 21 relative to the feed speed control 20.

Once the diamond cutter 15 has been aligned both vertically and horizontally relative to the axis of rotation of the lens blank 31, the operator is able to cut as many lenses as desired without having to repeat the set-up operation.

Each lens blank inserted into the mounting collet 13 will be automatically centered therein, and consequently aligned with the cutter 15. The radius generating cams 101 are also interchangeable without affecting alignment. Any desired curvature can be produced in a lens blank by use of the proper cam 101.

If desired, the cutter 15 may be advanced axially of the lens blank 31 after a first cutting operation by means of the coarseness selector handle 17, and the auto-cycle switch 24 can be reactivated to repeat the cutting cycle as previously described. This procedure provides a highly finished curved surface, as represented by curves 35, 36 and 37, thereby requiring minimal polishing.

Figure 5:
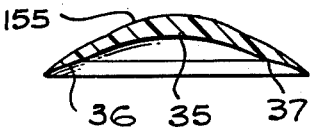
FIG. 5 is an enlarged, sectional view through a lens blank in which both faces have been formed.
Figure 2:
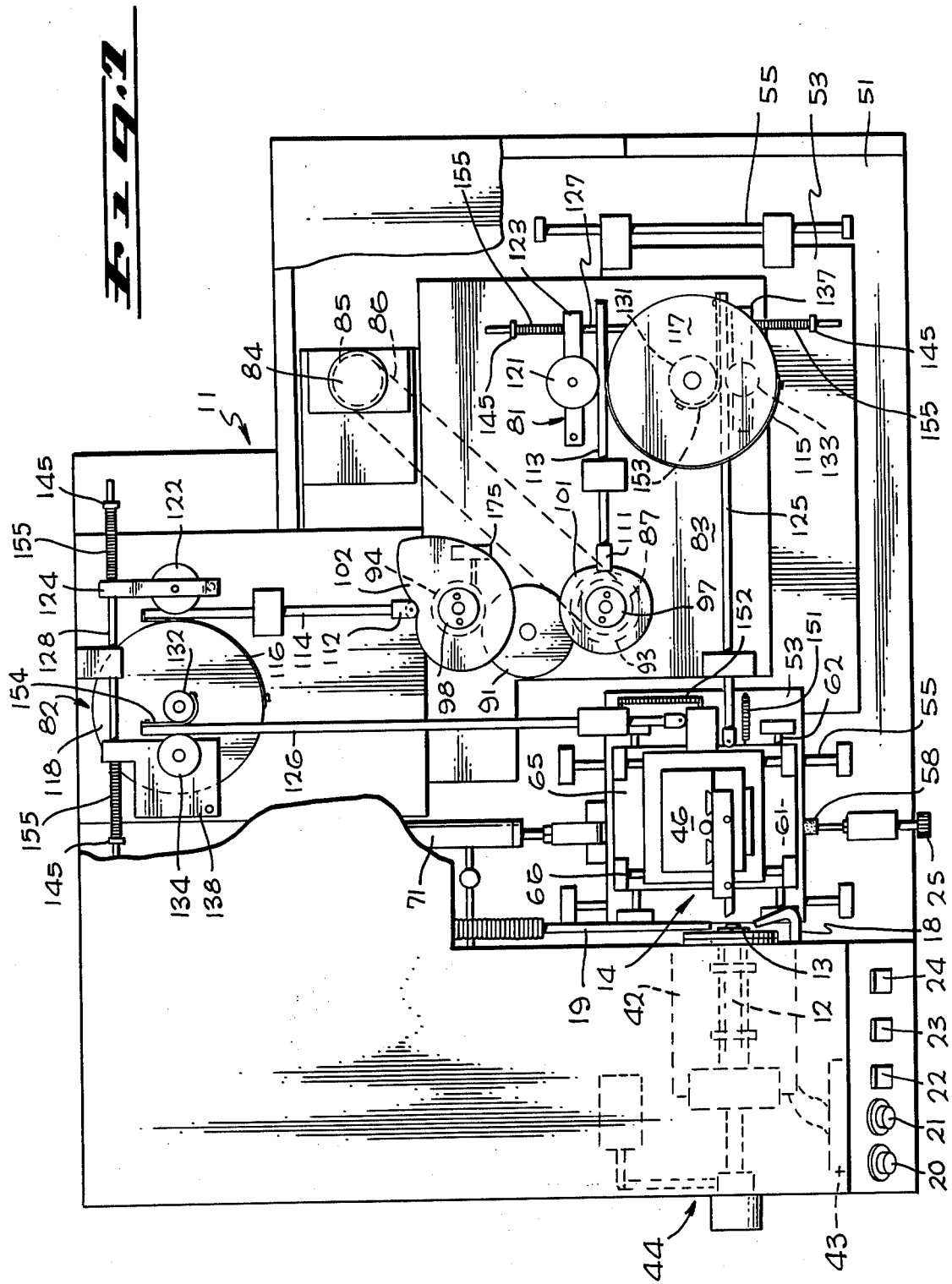

As mentioned earlier, at the end of the cutting cycle the partially formed lens blank 31 is removed from the collet 13, is polished and then mounted on the mandrel 32 with its unfinished side exposed. The mandrel 32 is inserted into a new collet 13 or mounted to a second lathe; a new radius-generating cam 101 conforming to the desired convex lenticular curves 155 is slipped in place on the capstan 97; and the automated process just described is repeated by activation of the auto-cut switch 24 to produce convex lenticular curves 155 in the lens blank 31, as illustrated in FIG. 5.

The surface cutting having been completed, the mandrel 32 is then removed from the collet 13 and mounted on a polishing machine for polishing of the lenticular surfaces 155. The lens blank 31 is then cut to the desired diameter and its periphery polished to eliminate sharge edges. It is now in the form or shape of a completed contact lens, ready to be released from the mandrel 32, cleaned, and placed in storage.

FIG. 10 shows an alternative means for driving one or both of the stages 61 and 65. In place of the cam-operated mechanisms shown in FIGS. 6 and 7, a D.C. torque motor, linear motor, or other suitable variable speed motor 211 is mounted on carriage 53. A sliding wedge 212 is threaded on the output shaft 213 of the motor 211 and slidingly keyed to a rail 214 secured to the carriage 53. An encoder 217, a potentiometer, or other electronic feedback device suitable for controlling the motor 211, is operatively connected to the shaft 213 and precisely controls the linear motion of the wedge 212 along the shaft 213 in response to instructions from a computer 215 programmed to generate the desired optical surfaces.

A follower 221 and follower rod 222 are arranged to respond axially to the linear motion of the wedge 212. The follower rod 222 in turn operates a 5:1 reduction drive mechanism 223, similar to the radius-generating drive 81 and the cross-feed drive 82 of FIGS. 6 and 7. As in the previous embodiments, a drive rod 225 moves the stage 226 against the force exerted by a spring 227.

It will be apparent from the foregoing description of the construction and operation of the subject invention that although intended primarily for use in the production of plastic contact lenses, with the proper cutter and cams or computer program, the invention can be employed with equal facility in a variety of applications.

Although two particular preferred embodiments of the invention have been disclosed for illustrative purposes, it will be understood that numerous other variations and modifications thereof are contemplated which lie within the scope of the appended claims.

What is claimed is:

1. A lathe having a guided movable cutter for surfacing contact lenses, comprising:
    base means;
    a motor secured to said base means;
    collet means driven by said motor and adapted to releasably retain a cylindrical lens blank for rotation therewith;
    a first stage supported on said base means for movement thereon parallel to the axis of rotation of said collet means
    a second stage mounted to said first stage for movement thereon perpendicular to the axis of rotation of said collet means;
    a cutting tool mounted to said second stage;
    radius-generating drive means comprising,
        first and second coaxial drive wheels mounted to said base for rotation in concert thereon;
        first and second idler wheels adjacent to and substantially coplanar with said first and second drive wheels, respectively;
        means for mounting said first and second idler wheels to said base and urging them radially toward said first and second drive wheels, respectively;
        first rod means mounted to said base means for reciprocating axial movement, passing between said first drive wheel and said first idler wheel and held therebetween by said first idler wheel;
        second rod means mounted to said base means essentially parallel to the axis of said lens blank for reciprocating axial movement, passing between said second drive wheel and said second idler wheel and held therebetween by said second idler wheel, and engaging said first stage in driving relationship;
        first substantially nonextensible and noncompressible band means passing between said first rod means and said first drive wheel and connected at one end to said first rod means and at the other end to the periphery of said first drive wheel, such that slippage between said first rod means and said first drive wheel is eliminated and the axial movement of said first rod means is transformed into corresponding rotational movement of said first drive wheel;
        second substantially nonextensible and noncompressible band means passing between said second rod means and said second drive wheel and connected at one end to said second rod means and at the other end to the periphery of said second drive wheel such that slippage between said second drive wheel and said second rod means is eliminated and the rotational movement of said second drive wheel is transformed into corresponding axial movement of said second rod means;
        means for imparting a desired pattern of axial motion to said first rod means;
        whereby said axial motion of said first rod means is accurately transferred through said first drive wheel, said first and second band means, said second drive wheel and said second rod means, to said first stage, effectively driving said first stage axially with respect to said lens blank;
    cross-feed drive means comprising,
        third and fourth coaxial drive wheels mounted to said base for rotation in concert thereon;
        third and fourth idler wheels adjacent to and substantially coplanar with said third and fourth drive wheels, respectively;
        means for mounting said third and fourth idler wheels to said base and urging them radially toward said third and fourth drive wheels, respectively;
        third rod means mounted to said base means for reciprocating axial movement, passing between said third drive wheel and said third idler wheel and held therebetween by said third idler wheel;
        fourth rod means mounted to said base means essentially perpendicular to the axis of said lens blank for reciprocating axial movement, passing between said fourth drive wheel and said fourth idler wheel and held therebetween by said fourth idler wheel, and engaging said second stage in driving relationship;
        third substantially nonextensible and noncompressible band means passing between said third rod means and said third drive wheel and at the other end to the periphery of said third drive wheel, such that slippage between said third rod means and said third drive wheel is eliminated and the axial movement of said third rod means is transformed into corresponding rotational movement of said third drive wheel;
        fourth substantially nonextensible and noncompressible band means passing between said fourth rod means and said fourth drive wheel and connected at one end to said fourth rod means and at the other end to the periphery of said fourth drive wheel such that slippage between said fourth drive wheel and said fourth rod means is eliminated and the rotational movement of said fourth drive wheel is transformed into corresponding axial movement of said fourth rod means;
        means for imparting a desired pattern of axial motion to said third rod means;
        whereby said axial motion of said third rod means is accurately transferred through said third drive wheel, said third and fourth band means, said fourth drive wheel and said fourth rod means, to said third stage, effectively driving said second stage axially with respect to said lens blank and motor means associated with, and effectively synchronously driving said radius-generating drive means and said cross-feed drive means.

2. A lathe according to claim 1 wherein said base means includes a carriage supported on a base element for movement thereon perpendicular to the axis of rotation of said collet, said carriage supporting said first and second stages, said radius-generating drive means and said cross-feed drive means; and carriage drive means mounted to said base element for effectively moving said carriage perpendicular to the axis of rotation of said spindle.

3. A lathe according to claim 2 wherein first, second, third and fourth nonextensible and noncompressible band means comprise carbon filament bands.

4. A lathe according to claim 3 wherein said means for imparting a desired pattern of axial motion to said first rod means and said means for imparting a desired pattern of axial motion to said third rod means comprise a pair of cams and associated cam followers driven by said motor means.

5. A lathe having a guided movable cutter for surfacing contact lenses, comprising:
a base;
a motor secured to said base and having a drive spindle;
a collet secured to and aligned coaxially with said spindle and adapted to releasably retain a cylindrical lens blank in coaxial alignment with said spindle;
a carriage supported on said base for movement thereon perpendicular to the axis of rotation of said spindle;
a first stage supported on said carriage for movement thereon parallel to the axis of rotation of said spindle;
a second stage mounted to said first stage for movement thereon perpendicular to the axis of rotation of said spindle;
a cutting tool mounted to said second stage;
radius-generating drive means mounted to said carriage and effectively driving said first stage axially with respect to said lens blank;
cross-feed drive means mounted to said carriage and effectively driving said second stage radially with respect to said lens blank;
motor means associated with, and effectively synchronously driving said radius-generating drive means and said cross-feed drive means; and
carriage drive means mounted to said base for effectively moving said carriage perpendicular to the axis of rotation of said spindle.

6. A lathe according to claim 5 which includes a tool post mounted to the surface of said second stage supporting said cutter for movement of said cutter normal to said surface; and first adjustment means associated with said tool post controllably moving said cutter normal to said surface, whereby said cutter can be aligned with the axis of rotation of said spindle.

7. A lathe according to claim 6 which includes a carriage positioning means mounted to said base including a movable stop adapted to abut said carriage and thereby limit the movement thereof perpendicular to the axis of rotation of said spindle; second adjustment means associated with said carriage positioning means controllably spacing said stop from the axis of rotation of said spindle, whereby said carriage can be indexed with said cutter aligned with the axis of rotation of said spindle.

8. A lathe according to claim 7 which includes a mounting means mounting said tool post to said second stage for limited movement parallel to the axis of rotation of said spindle; and third adjustment means associated with said tool post controllably spacing said tool post from said collet, thereby controlling the depth of the cut made by said cutter in a lens blank mounted to said collet.

9. A lathe according to claim 7 which includes mounting means mounting said tool post to said second stage for movement of said tool post between a first position on said second stage spaced from said collet and a second position on said second stage spaced a greater distance from the collet; third adjustment means associated with said tool post selectively moving said tool post between said first position and said second position.

10. A lathe according to claim 7 which includes a pair of cams and associated cam followers driven by said motor means effectively driving said radius-generating drive drive means and cross-feed drive means.

11. A lathe according to claim 10 which includes a pair of mounting means operatively mounting said cams to said carriage; a cross-feed cam mounted to one of said mounting means associated with said cross-feed drive means to effectively drive said first stage at a velocity conforming to the contour thereof; and a plurality of radius-generating cams, each of which is interchangeably mountable to the other of said mounting means associated with said radius-generating drive means to effectively drive said second stage in cooperation with said cross-feed cam to trace predetermined optical curves conforming to the contours thereof.

12. A lathe according to claim 7 which includes control means associated with said motor, motor means and carriage drive means effectively activating and deactivating said motor, motor means and carriage drive means in a sequence in response to control signals; and signal generating means effectively connected to said control means for selectively generating said control signals.

13. The lathe recited in claim 5 wherein said collet passes coaxially through said spindle and is mounted therein.

14. A lathe having a guided movable cutter for surfacing contact lenses, comprising:
a base;
a motor secured to said base and having a drive spindle;
a collet secured to and aligned coaxially with said spindle adapted to releasably retain a cylindrical lens blank in coaxial alignment with said spindle;
a carriage supported on said base for movement perpendicular to the axis of rotation of said spindle;
a cutter;
cutter support means mounting said cutter to said carriage for orthogonal movement of said cutter with respect to the axis of rotation of said spindle;
radius-generating drive means and cross-feed drive means mounted to said carriage effectively moving said cutter support means axially and radially of said lens blank, respectively, whereby said cutter traces a predetermined optical curve in said lens blank;

motor means associated with, and effectively synchronously driving said radius-generating drive means and said cross-feed drive means;

carriage drive means mounted to said base for effectively positioning said carriage with respect to the axis of rotation of said spindle;

control means effectively activating and deactivating said motor, motor means and carriage drive means in response to control signals; and signal generating means effectively connected to said control means for selectively generating said control signals.

15. The lathe recited in claim 14 wherein said collet passes coaxially through said spindle and is mounted therein.

16. A lathe having a guided movable cutter for surfacing contact lenses, comprising:

a base;

a motor secured to said base and having a drive spindle;

a collet secured to and aligned coaxially with said spindle and adapted to releasably retain a cylindrical lens blank in coaxial alignment with said spindle;

a carriage supported on said base for movement thereon perpendicular to the axis of rotation of said spindle, a first stage supported on said carriage for movement thereon parallel to the axis of rotation of said spindle;

a second stage mounted to said first stage for movement thereon perpendicular to the axis of rotation of said spindle;

a cutting tool mounted to said second stage;

radius-generating drive means mounted to said carriage and effectively driving said first stage axially with respect to said lens blank;

cross-feed drive means mounted to said carriage and effectively driving said second stage radially with respect to said lens blank;

motor means associated with, and effectively synchronously driving said radius-generating means and said cross-feed drive means, including a pair of variable speed motors;

a pair of sliding wedges and associated followers mounted to said carriage and driven by said motors effectively driving said radius-generating drive means and cross-feed drive means;

control means associated with said sliding wedges controlling said motors to move said sliding wedges in response to a predetermined control program, thereby effectively causing said second stage to trace selected optical curves; and carriage drive means mounted to said base for effectively moving said carriage perpendicular to the axis of rotation of said spindle.

17. A lathe having a guided movable cutter for surfacing contact lenses, comprising:

a base;

a motor secured to said base and having a drive spindle;

a collet secured to and aligned coaxially with said spindle and adapted to releasably retain a cylindrical lens blank in coaxial alignment with said spindle;

a carriage supported on said base for movement thereon perpendicular to the axis of rotation of said spindle;

a first stage supported on said carriage for movement thereon parallel to the axis of rotation of said spindle;

a second stage mounted to said first stage for movement thereon perpendicular to the axis of rotation of said spindle;

a cutting tool;

a tool post mounted to the surface of said second stage supporting said cutting tool for movement of said cutting tool normal to said surface;

first adjustment means associated with said tool post controllably moving said cutting tool normal to said surface, whereby said cutting tool can be aligned with the axis of rotation of said spindle;

radius-generating drive means mounted to said carriage and effectively driving said first stage axially with respect to said lens blank;

cross-feed drive means mounted to said carriage and effectively driving said second stage radially with respect to said lens blank;

motor means associated with, and effectively synchronously driving said radius-generating drive means and said cross-feed drive means, including a pair of variable speed motors;

a pair of sliding wedges and associated followers mounted to said carriage and driven by said motors effectively driving said radius-generating drive means and cross-feed drive means;

control means associated with said sliding wedges controlling said motors to move said sliding wedges in response to a predetermined control program, thereby effectively causing said second stage to trace selected optical curves;

carriage drive means mounted to said base for effectively moving said carriage perpendicular to the axis of rotation of said spindle;

carriage positioning means mounted to said base including a movable stop adapted to abut said carriage and thereby limit the movement thereof perpendicular to the axis of rotation of said spindle; and second adjustment means associated with said carriage positioning means controllably spacing said stop from the axis of rotation of said spindle, whereby said carriage can be indexed with said cutter aligned with the axis of rotation of said spindle.

* * * * *